United States Patent [19]
Ippommatsu et al.

[11] Patent Number: 6,054,232
[45] Date of Patent: *Apr. 25, 2000

[54] FUEL ELECTRODE FOR SOLID ELECTROLYTE FUEL CELLS AND A METHOD FOR MANUFACTURE OF THE ELECTRODE

[75] Inventors: Masamichi Ippommatsu, Hyogo-ken; Minoru Suzuki, Osaka-fu; Hirokazu Sasaki, Osaka-fu; Shoji Otoshi, Osaka-fu; Hisao Ohnishi, Osaka-fu, all of Japan

[73] Assignee: Osaka Gas Company Limited, Osaka-fu, Japan

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/748,120

[22] Filed: Nov. 12, 1996

Related U.S. Application Data

[63] Continuation of application No. 08/532,317, Sep. 20, 1995, abandoned, which is a continuation of application No. 08/340,963, Nov. 17, 1994, abandoned, which is a continuation of application No. 08/195,420, Feb. 14, 1994, abandoned, which is a continuation of application No. 07/650,138, Feb. 4, 1991, Pat. No. 5,286,580.

[30] Foreign Application Priority Data

Feb. 9, 1990 [JP] Japan ........................... 2-30224

[51] Int. Cl.$^7$ ........................................ H01M 4/86
[52] U.S. Cl. ................... 429/40; 429/42; 429/44; 429/45
[58] Field of Search ................... 429/30, 40, 42, 429/44, 115, 45

[56] References Cited

U.S. PATENT DOCUMENTS

| | | | |
|---|---|---|---|
| 4,190,516 | 2/1980 | Kajimaya et al. | 224/290 |
| 4,478,917 | 10/1984 | Fujita et al. | 429/33 |
| 5,286,580 | 2/1994 | Ippommatsu et al. | 429/40 |

*Primary Examiner*—Bruce F. Bell
*Attorney, Agent, or Firm*—Jordan and Hamburg LLP

[57] ABSTRACT

The invention relates to a fuel electrode for high-temperature solid electrolyte fuel cells and a process for manufacture of the electrode. The fuel electrode of the invention is a porous element composed of a high-melting metal, such as ruthenium, osmium, rhodium or iridium, or an alloy containing the metal. The process for manufacture of the fuel electrode comprises coating an electrode material with a solution or dispersion of the high-melting metal and/or its chloride, sintering the same and finally reducing the product.

9 Claims, No Drawings

FUEL ELECTRODE FOR SOLID ELECTROLYTE FUEL CELLS AND A METHOD FOR MANUFACTURE OF THE ELECTRODE

This application is a continuation, of application Ser. No. 08/532,317, filed Sep. 20, 1995, now abandoned, which, in turn, is a continuation of application Ser. No. 08/340,963, filed Nov. 17, 1994, now abandoned, which, in turn, is a continuation of Ser. No. 08/195,420, filed Feb. 14, 1994, now abandoned, which, in turn, is a continuation of Ser. No. 07/650,138, filed Feb. 4, 1991, now U.S. Pat. No. 5,286,580.

BACKGROUND OF THE INVENTION

The present invention relates to a fuel electrode for high-temperature solid electrolyte fuel cells and a method for manufacture of the electrode.

Heretofore, nickel/zirconia ($Ni/ZrO_2$) cermets have been employed for fuel electrodes in commercialized high-temperature solid electrolyte fuel cells.

These $Ni/ZrO_2$ cermets are typically produced by the following alternative processes.

(1) A process in which $NiO/ZrO_2$ is sintered and then reduced to provide a $Ni/ZrO_2$ cermet (e.g. the Ceramatec process described in Proceedings of SOFC-NAGOYA, p.24).

(2) A process, known as Westinghouse process, in which $ZrO_2$ in a crude $Ni/ZrO_2$ cermet is caused to grow into spaces between Ni grains by the EVD technique (Japanese Kokai Patent Publication No. 61-153280).

Aside from the above, porous platinum (Pt) materials obtainable by sintering platinum pastes have been used in $ZrO_2$ sensors and the like or in basic research.

However, the $Ni/ZrO_2$ cermet electrode manufactured by the first-mentioned process is disadvantageous in that when the fuel cell is run over thousands of hours at temperatures near 1,000° C., the Ni grains therein are sintered to degrade the electrode and ultimately cause exfoliation of the electrode. Increasing the proportion of $ZrO_2$ for avoiding this sintering detracts from the performance of the electrode.

The $Ni/ZrO_2$ cermet manufactured by the second-mentioned process is resistant to sintering and insures a satisfactory electrode performance, but, since it involves an EVD step, the overall manufacturing process is complicated and the cost of manufacture is increased.

The porous platinum electrode is disadvantageous in that the platinum reacts with the impurity metal in the fuel and is vaporized in continuous operation in a reducing atmosphere resulting in early aging of the electrode. Furthermore, platinum is an expensive metal and the manufacture of porous platinum electrodes is costly.

SUMMARY OF THE INVENTION

The object of the present invention is to overcome the above disadvantages and provide an improved fuel electrode which does not undergo sintering or aging even when the fuel cell is operated continuously for a long time at high temperature and a simple method for manufacture of the electrode.

The fuel electrode of the invention for high-temperature solid electrolyte fuel cells is characterized in that it is a porous element composed of a high-melting metal having a melting point of not less than 1,900° C. or an alloy containing said high-melting metal.

As species of the high-melting metal with a melting point of not less than 1,900° C., there may be mentioned ruthenium (Ru), osmium (Os), rhodium (Rh) and iridium (Ir).

As apparent from the melting points presented below, Ru, Os, Rh and Ir melt at higher temperatures than Ni and Pt and are more sintering-resistant. Because they are highly resistant to sintering, ceramication is not required. Furthermore, since the resistance to sintering is high, it is feasible to design a system with a long interfacial dimension of the three-phase zone of $ZrO_2$/Metal/GAS (if such a structure is designed with Ni, sintering soon occurs) and thereby reduce all the reaction polarization, diffusion polarization and resistance polarization of the electrode,

|    | Melting points |
|----|----------------|
| Ni | 1453° C.       |
| Pt | 1769° C.       |
| Ru | 2500° C.       |
| Rh | 1960° C.       |
| Ir | 2443° C.       |
| Os | 2700° C.       |

Of the above-mentioned four metals, Ru is the most advantageous in that;

(1) A high melting point and stability even in a reducing atmosphere;

(2) Low cost; and (3) High catalyst activity for steam reforming of $CH_4$ which is an important factor in electrode performance.

Osmium (Os) is also useful, but in view of the high vapor pressure of $OsO_4$ and its high toxicity, it is somewhat handicapped for commercial exploitation as compared with Ru.

The fuel electrode of the present invention for high-temperature solid electrolyte fuel cells can be manufactured by dissolving or dispersing at least one of powdery Ru, Os, Rh and Ir or at least one of ruthenium chloride, osmium chloride, rhodium chloride and iridium chloride in an organic solvent or water, coating an electrode material with the resulting solution or dispersion, sintering the same and finally reducing it. It should be understood that said powdery metal and metal chloride may be used in combination.

The sintering operation is preferably conducted in an oxidizing atmosphere at a temperature of 400~1000° C. and the reduction reaction is preferably conducted at a temperature of 500~1,300° C.

Preferably the reduction is conducted in a reducing atmosphere, particularly in a hydrogen ($H_2$) atmosphere.

The organic solvent to be used is preferably a low-boiling solvent and more desirably an alcohol of 1 to 6 carbon atoms. The most advantageous are propanol and butanol.

In terms of the ease of porosity control and handling, it is good practice to employ a high molecular weight compound soluble in the organic solvent or in water. Among such high molecular weight compounds are polybutyl alcohol, polyvinyl alcohol and methylcellulose.

Compared with the conventional $Ni/ZrO_2$ cermet electrode, the electrode according to the present invention has the following meritorious characteristics.

(1) Substantially no sintering occurs even when the fuel cell is run for thousands of hours at 1,000° C.

(2) Each of the reaction, diffusion and resistance polarization values are as small as several mV at 200 $mA/cm^2$.

Particularly when Ru is employed, not only an excellent electrode performance is insured but the manufacturing cost can be kept down for profitable commercial application.

Furthermore, since the manufacturing method according to the present invention is a simple process comprising coating an electrode material with an aqueous or organic solution or dispersion of a powdery high-melting metal and/or a high-melting metal chloride, sintering the same and, then, reducing it, the manufacturing flow is simple and the cost of manufacture is low. Moreover, the concomitant use of said high molecular compound soluble in the organic solvent or water facilitates porosity control and handling.

DETAILED DESCRIPTION OF THE PREFERRED EMBODIMENTS

The following examples and comparative examples are intended to illustrate the invention in further detail and should by no means be construed as defining the metes and bounds of the invention.

EXAMPLE 1

In 89 parts by weight of n-butanol were dissolved 10 parts by weight of hydrous ruthenium trichloride ($RuCl_3.3H_2O$) and 1 part by weight of polybutyl alcohol, and pellets (2 cm in diameter and 0.2 mm thick) of yttria-doped zirconia (ZrO containing 8 mol % of $Y_2O_3$; hereinafter referred to as YSZ) were coated with the resulting solution. The coated pellets were heated in the air at 850° C. and, then, reduced in a $H_2$ atmosphere at 1,000° C. to provide a porous electrode having a thickness of 50 μm. Using this as the fuel electrode, a fuel cell was fabricated and a fuel gas composed of 90 vol % of $H_2$ and 10 vol % of $H_2O$ and the air were passed to the fuel electrode and the air electrode, respectively, to investigate the polarization characteristics at 200 $mA/cm^2$. As a result, all the reaction, diffusion and resistance polarization values were not larger than 5 mV. The same fuel electrode was maintained in $H_2$ streams at 1,000° C. for 1,315 hours and similar determinations were made. As a result, no significant difference was found in any of these parameter values.

EXAMPLE 2

To 30 parts by weight of a 5% aqueous solution of polyvinyl alcohol were added 70 parts by weight of powdery ruthenium metal (particle size 1~5 μm) followed by thorough mixing. Then, YSZ pellets were coated with the resulting slurry. The coated pellets were heated in the air at 500° C. (for removal of the binder) and, then, reduced in streams of a gas composed of 5 vol % of $H_2$ and 95 vol % of $N_2$ at 1,050° C. to provide a porous electrode having a thickness of 50 μm. The performance of this electrode was comparable to that of the electrode obtained in Example 1.

EXAMPLE 3

In 89 parts by weight of water were dissolved 10 parts by weight of hydrous ruthenium trichloride and 1 part by weight of polyvinyl alcohol. YSZ pellets were coated with the resulting solution and, thereafter, the procedure described in Example 2 was repeated to provide an electrode. The performance of this electrode was comparable to that of the electrode obtained in Example 1.

EXAMPLE 4

In 35 parts by weight of a 5% aqueous solution of polyvinyl alcohol were dissolved 3 parts by weight of ruthenium chloride followed by addition of 62 parts by weight of powdery ruthenium metal to prepare a slurry. YSZ pellets were coated with the above slurry and the coated pellets were dried at room temperature and heated in the air at 500° C. Then, the pellets were reduced in streams of a gas composed of 5 vol % of $H_2$ and 95 vol % of $N_2$ at 1,050° C. The characteristics of the resulting electrode (about 50 μm thick) were similar to those of the electrode obtained in Example 1.

COMPARATIVE EXAMPLE 1

A 70 weight % suspension of powdery NiO plus powdery YSZ (NiO:YSZ=6:4, w/w) in ethanol was used to coat the same YSZ pellets as used in Example 1. The coated pellets were sintered in the air at 1,300° C. and, then, reduced in a hydrogen stream at 1,000° C. to provide a $Ni/ZrO_2$ cermet electrode. This electrode was tested for various parameters as in Example 1. As a result, the sum of reaction polarization and diffusion polarization values at 200 $MA/cm^2$ was 30~100 mV. When the same electrode was maintained in a stream of $H_2$ at 1,000° C. for 1,050 hours, extensive exfoliation took place.

What is claimed is:

1. A fuel electrode for high-temperature solid electrolyte fuel cells, the fuel electrode being a porous element produced by the process of coating ruthenium on an electrode material and sintering the same.

2. The fuel electrode of claim 1, wherein the ruthenium is a ruthenium metal powder having a particle size of 1–5 μm, a ruthenium chloride, or a combination thereof; and further comprising a step of reducing the coating after the step of sintering.

3. A process for manufacturing a fuel electrode comprising dissolving or dispersing ruthenium powder or ruthenium chloride or a combination thereof in an organic solvent or water as a dissolving or dispersing agent, coating an electrode material with the resulting solution or dispersion, sintering the same and reducing it.

4. A process according to claim 3 wherein the dissolving or dispersing agent is water and the process further comprises adding a high molecular weight compound, which is soluble in water, to the dissolving or dispersing agent.

5. A process according to claim 4 wherein said high molecular weight compound is polyvinyl alcohol.

6. A process for manufacturing a fuel electrode comprising dissolving or dispersing ruthenium powder having a particle size of 1–5 μm, or ruthenium chloride, or a combination thereof in an organic solvent or water as a dissolving or dispersing agent, coating an electrode material with the resulting solution or dispersion, sintering the same and reducing it.

7. A process according to claim 3 wherein said sintering is performed at 400 to 1,000° C. followed by reduction at 500 to 1,300° C.

8. A process according to claim 3 or 6, wherein said dissolving or dispersing agent is an organic solvent and said organic solvent is an alcohol of 1 to 6 carbon atoms.

9. A process according to claim 8, further comprising adding a high molecular weight compound, which is soluble in the alcohol, to the dissolving or dispersing agent.

* * * * *